us009454667B2

(12) United States Patent
Branson et al.

(10) Patent No.: US 9,454,667 B2
(45) Date of Patent: Sep. 27, 2016

(54) GRANTING OBJECT AUTHORITY VIA A MULTI-TOUCH SCREEN TO A COLLABORATOR

(75) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 13/288,267

(22) Filed: Nov. 3, 2011

(65) Prior Publication Data
US 2013/0117699 A1  May 9, 2013

(51) Int. Cl.
G06F 21/60 (2013.01)
G06F 21/62 (2013.01)
H04L 29/06 (2006.01)
G06F 3/0488 (2013.01)

(52) U.S. Cl.
CPC .......... G06F 21/604 (2013.01); G06F 3/0488 (2013.01); G06F 21/6281 (2013.01); H04L 63/10 (2013.01); G06F 2203/04808 (2013.01); G06F 2221/2105 (2013.01); G06F 2221/2109 (2013.01); G06F 2221/2137 (2013.01)

(58) Field of Classification Search
CPC .............. G06F 21/604; G06F 3/0488; G06F 21/6281; H04L 63/10
USPC ....................................................... 715/769
See application file for complete search history.

(56) References Cited

U.S. PATENT DOCUMENTS

| 6,397,191 | B1 * | 5/2002 | Notani et al. ............. 705/7.26 |
| 6,728,784 | B1 * | 4/2004 | Mattaway .......... H04L 12/1822 370/260 |
| 7,624,192 | B2 * | 11/2009 | Meyers et al. ............... 709/238 |
| 8,091,029 | B1 * | 1/2012 | Gay et al. ..................... 715/734 |
| 8,217,854 | B2 * | 7/2012 | Bhogal et al. ................. 345/1.1 |
| 2005/0132299 | A1 * | 6/2005 | Jones et al. .................... 715/759 |
| 2006/0242422 | A1 * | 10/2006 | Hong et al. .................... 713/182 |
| 2007/0294632 | A1 * | 12/2007 | Toyama et al. ............... 715/764 |
| 2009/0091539 | A1 * | 4/2009 | Do ....................... G06F 1/1632 345/173 |
| 2009/0106667 | A1 | 4/2009 | Lyle et al. |
| 2009/0126010 | A1 * | 5/2009 | Chakra et al. ................. 726/20 |
| 2009/0205049 | A1 * | 8/2009 | Chakra et al. ................. 726/26 |
| 2009/0217177 | A1 * | 8/2009 | DeGrazia ..................... 715/753 |
| 2009/0235175 | A1 * | 9/2009 | Kardamilas .......... G06F 9/4443 715/736 |
| 2009/0307604 | A1 * | 12/2009 | Giles et al. .................... 715/751 |
| 2010/0107219 | A1 * | 4/2010 | Thompson et al. ............. 726/2 |
| 2010/0211886 | A1 | 8/2010 | Forstall et al. |
| 2011/0055729 | A1 | 3/2011 | Mason et al. |

(Continued)

OTHER PUBLICATIONS

IBM, Role-Based Management in a Shared Multi-Cursor Interface, IPCOM000181886D, Apr. 16, 2009, pp. 1-3, ip.com.

(Continued)

*Primary Examiner* — Patrick Riegler
*Assistant Examiner* — Phoebe Pan
(74) *Attorney, Agent, or Firm* — Matthew C. Zehrer

(57) ABSTRACT

In an embodiment, in response to a gesture by an administrator, a security palette is created and displayed on a multi-touch screen. In response to a move by the administrator of a first icon to within the security palette, wherein the first icon represents a first object, a same authority that the administrator has to the first object is granted to the security palette. In response to a collaborator touching the security palette, the same authority to the first object is granted to the collaborator.

19 Claims, 5 Drawing Sheets

(56) References Cited

U.S. PATENT DOCUMENTS

| | | | |
|---|---|---|---|
| 2011/0078573 A1* | 3/2011 | Ooba | G06F 9/4443 715/733 |
| 2012/0254858 A1* | 10/2012 | Moyers | H04L 12/1818 717/177 |
| 2012/0327106 A1* | 12/2012 | Won et al. | 345/619 |
| 2013/0201132 A1* | 8/2013 | Kunioka et al. | 345/173 |

OTHER PUBLICATIONS

Meredith Ringel Morris, et al., Cooperative Gestures: Multi-User Gestural Interactions for Co-located Groupware, CHI 2006, Apr. 22-28, 2006, pp. 1-10, Montreal, Quebec, Canada.

* cited by examiner

US 9,454,667 B2

GRANTING OBJECT AUTHORITY VIA A MULTI-TOUCH SCREEN TO A COLLABORATOR

FIELD

An embodiment of the invention generally relates to computer systems and more particularly to a computer system with a multi-touch screen user interface.

BACKGROUND

Computer systems typically comprise a combination of computer programs and hardware, such as semiconductors, transistors, chips, circuit boards, storage devices, and processors. The computer programs are stored in the storage devices and are executed by the processors.

One use of computer systems is in a technology known as surface based or multi-touch computing, in which users interact with a touch screen or other surface to interact with digital content through natural gestures, touch, and physical objects. The multi-touch screen accepts input from multiple users simultaneously, allowing for complex gestures, including grabbing, stretching, swiveling, and sliding virtual objects. The display area of surface-based computing devices can vary from relatively small areas, such as that of a small desk or video screen, to relatively large areas, such as a conference table surface. The multi-touch screen may use a variety of technologies, such as projectors to project images onto a surface and cameras to detect gestures.

SUMMARY

A method, computer-readable storage medium, and computer system are provided. In an embodiment, in response to a gesture by an administrator, a security palette is created and displayed on a multi-touch screen. In response to a move by the administrator of a first icon to within the security palette, wherein the first icon represents a first object, a same authority that the administrator has to the first object is granted to the security palette. In response to a collaborator touching the security palette, the same authority to the first object is granted to the collaborator.

It is to be noted, however, that the appended drawings illustrate only example embodiments of the invention, and are therefore not considered a limitation of the scope of other embodiments of the invention.

DETAILED DESCRIPTION

Figure 1:
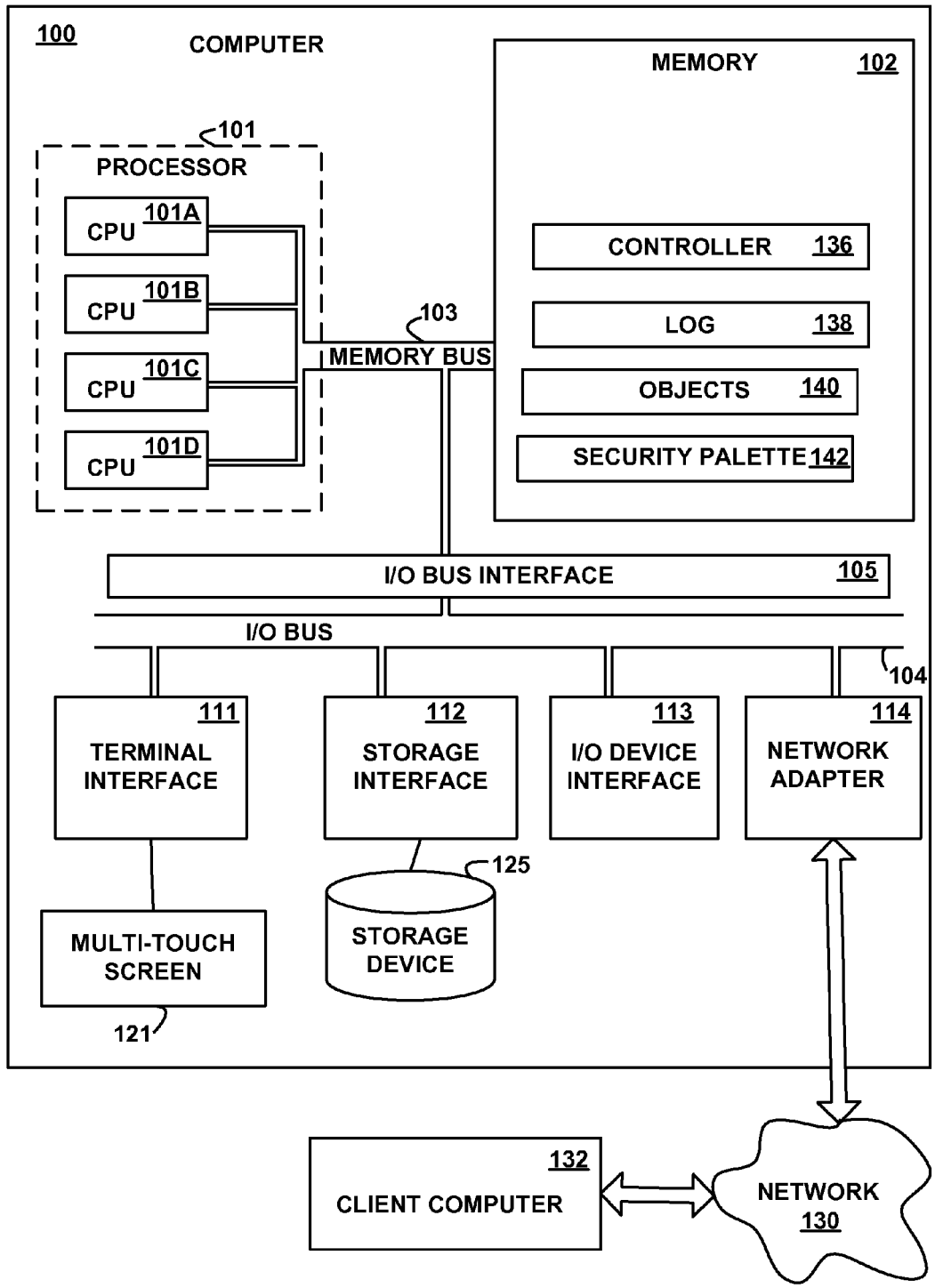
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a controller 136, a log 138, objects 140, and a security palette 142. Although the controller 136, the log 138, the objects 140, and the security palette 142 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 136, the log 138, the objects 140, and the security palette 142 are illustrated as being contained within the main memory 102, these elements are not necessarily all completely contained in the same storage device at the same time. Further, although the controller 136, the log 138, the objects 140, and the security palette 142 are illustrated as being separate entities, in other embodiments some of them, portions of some of them, or all of them may be packaged together.

In an embodiment, the controller 136 and/or the objects 140 comprise instructions or statements that execute on the processor 101 or instructions or statements that are interpreted by instructions or statements that execute on the processor 101, to carry out the functions as further described below with reference to FIGS. 2, 3, 4, and 5. In another embodiment, the controller 136 and/or the objects 140 are implemented in hardware via semiconductor devices, chips, logical gates, circuits, circuit cards, and/or other physical hardware devices in lieu of, or in addition to, a processor-based system. In an embodiment, the controller 136 comprises data in addition to instructions or statements. In an embodiment, the objects 140 comprise data in addition to or instead of instructions or statements. In various embodiments, the controller 136 is a user application, a third-party application, an operating system, a product or any portion, multiple, or combination thereof. In various embodiments, the objects 140 comprise system objects, tasks, data objects, window objects, devices, directories, sub-directories, files, databases, or any portion, combination, or multiple thereof. Examples of system objects comprise the client computer 132 or the computer 100, the I/O adapters 111, 112, 113, and 114, or the storage device 125. Examples of tasks comprise instructions that execute on the processor 101 or statements that are interpreted by instructions that execute on the processor 101, to perform functions or operations and to access (read, write, update, erase, or configure) data objects or system objects.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices or multi-touch screens 121, which may comprise user output devices (such as a video display device, projectors, a speaker, and/or television set) and user input devices (such as a camera, a keyboard, a mouse, a keypad, a touchpad, a trackball, buttons, Radio Frequency Identifier (RFID) Tags, a light pen, a finger, a stylus, or other pointing device). A user may manipulate the user input devices using a user interface, in order to provide input data and commands to the user I/O device or multi-touch screen 121 and the computer system 100, and may receive output data via the user output devices. For example, a user interface may be presented via the multi-touch screen 121, such as displayed on a display device. The multi-touch screen 121 may be of any size and may accommodate multiple users viewing and touching the multi-touch screen 121 simultaneously or collaboratively, and in an embodiment, any user may touch at any location on the multi-touch screen 121. The computer system 100 may distinguish between users that touch the multi-touch screen 121 via a ring, watch, or wristband worn by the different users, by different fingerprints of the different users, or by facial recognition via a camera. In various embodiments, the touch surface of the multi-touch screen 121 is large enough so that two users of average height and arm length cannot touch the same location on the multi-touch screen while the two users are positioned around the circumference of the multi-touch screen 121 at opposite ends or at opposite corners of the multi-touch screen 121. In various embodiments, the touch surface of the multi-touch screen 121 is large enough so that two or more users of average height and arm length cannot touch the same location on the multi-touch screen 121 while the two or more users are positioned around the circumference of the multi-touch screen 121 equidistant from each other. In various embodiments, the touch surface of the multi-touch screen 121 is greater than five square feet, greater than ten square feet, greater than fifteen square feet, greater than twenty square feet, or greater than thirty square feet.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
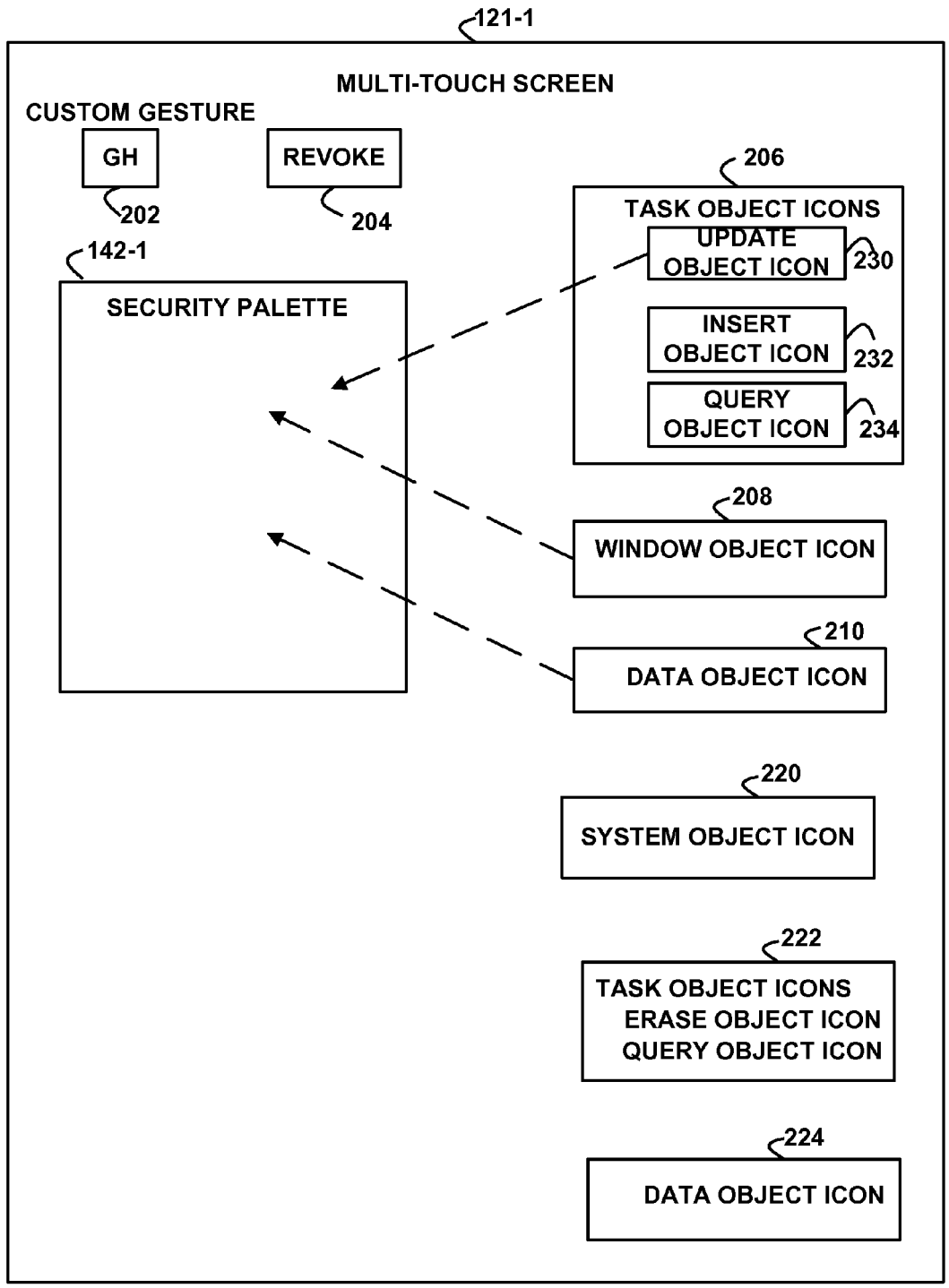
FIG. 2 depicts a block diagram of an example multi-touch screen prior to the movement of icons to a security palette, according to an embodiment of the invention.

FIG. 2 depicts a block diagram of the display of an example multi-touch screen 121-1 prior to the movement of icons 206, 208, and 210 to a security palette 142-1, according to an embodiment of the invention. The multi-touch screen 121-1 is an example of, and is generically referred to by, the multi-touch screen 121 (FIG. 1). The security palette 142-1 is an example display of the security palette 142 (FIG. 1) on the multi-touch screen 121-1.

The multi-touch screen 121-1 displays a security palette 142-1, a custom gesture 202, a revoke button 204, and icons 206, 208, 210, 220, 222, and 224. The security palette 142-1 is displayed as a shape, polygon, window or other object that has sides. The icon 206 comprises icons 230, 232, and 234, representing an update task, an insert task, and a query task, respectively. The icon 208 represents a window object. The icon 210 represents a data object. The icon 220 represents a system object. The icon 222 represents an erase task and a query task. The icon 224 represents a data object.

An administrator performs the custom gesture 202 on the multi-touch screen 121-1. In various embodiments, the custom gesture 202 may be implemented as signing the administrator's name or initials, selecting an option from a menu, or any other appropriate gesture or action. The controller 136 detects the custom gesture 202 and, in response, creates the security palette 142-1. The controller 136 determines the identity of the administrator by reading the fingerprints of the administrator from the touch screen, by scanning an RFID tag attached to the administrator's finger, wrist, arm, or other body part, or by scanning the administrator's face, and comparing the scanning or read information to a table, data structure, or database of known users, which is stored in the memory 102. The controller 136 further determines the level of authority the administrator possesses by reading the administrator's authority from a table, data structure, or database of known user identifiers and their assigned authorities. In various embodiments, the administrator's authority may comprise read authority, write authority, erase authority, update authority, execute authority, execute in privileged mode authority, or any combination thereof. The administrator's authority may further comprise authority to all objects in the computer system 100 or to less than all objects, such as only certain, specified objects in the computer system 100. The administrator may be any person or user with a valid user identifier, who has some level of authority to at least one object.

The administrator then drags or moves one or more icons, such as the icons 206, 208, and/or 210 into security palette 142-1, which causes the controller 136 to temporarily grant to the security palette 142-1 the same authority that administrator possesses (for the objects represented by the icons that are within the security palette 142-1) to the security palette 142-1. In another embodiment, the administrator selects the icons prior to performing the custom gesture 202. In response to the administrator touching or selecting the revoke button 204, the controller 136 revokes the authority of the security palette 142-1. The controller 136 may also revoke the authority of the security palette 142-1 in response to the ending of a time out period. In an embodiment, the security palette 142-1 may indicate how much time remains before the authority of the security palette 142-1 is revoked by fading the image of the security palette 142-1, by the security palette 142-1 becoming translucent over time, or by displaying a countdown clock in, or associated with, the security palette 142-1, thereby visually representing that time is running out to use the temporary security access.

The administrator may flip, toss, pass, or move the security palette 142-1 across the multi-touch screen 121 to be displayed in front of, or proximate to any collaborator. In another embodiment, any user may flip the security palette 142-1, not necessarily the administrator. The collaborator may be any user, different from the administrator. In response to the collaborator touching the security palette 142, the controller 136 grants, to the collaborator, temporary access to the objects represented by the icons in the security palette 142. In this way, the collaborator may collaborate with the administrator using the authority of the administrator.

Figure 3:
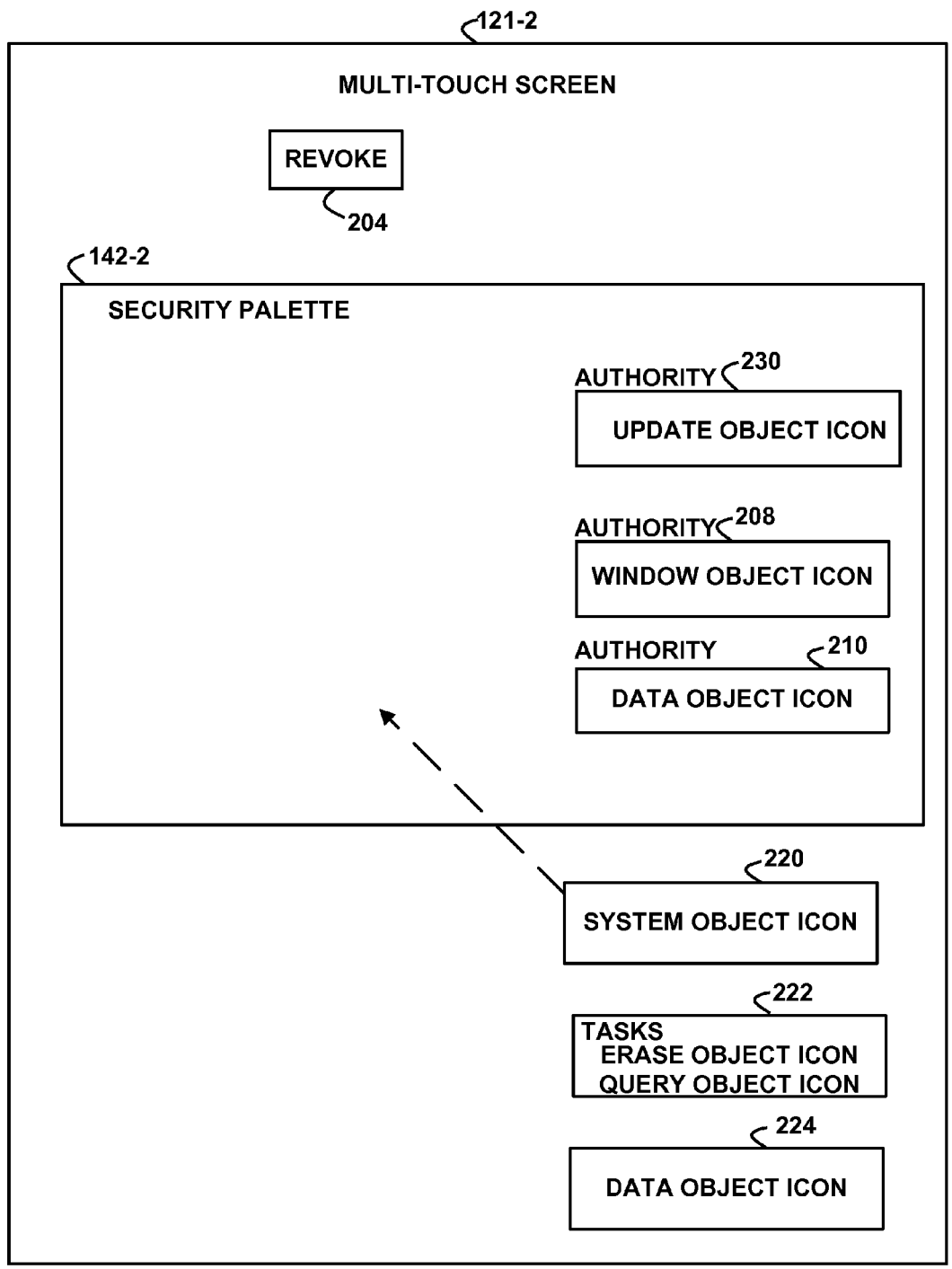
FIG. 3 depicts a block diagram of an example multi-touch screen after the movement of icons to a security palette by an administrator, according to an embodiment of the invention.

FIG. 3 depicts a block diagram of an example multi-touch screen 121-2 after the movement of objects to a security palette 142-2 by the administrator, according to an embodiment of the invention. The multi-touch screen 121-2 displays the security palette 142-2, a revoke button command 204, icons 208, 210, and 230 within the security palette 142-2, and icons 220, 222, and 224 outside of the security palette 142-2.

In an embodiment, the administrator moving an icon representing an object into the security palette 142-1 (FIG. 2) causes the controller 136 to give the same authority level as possessed by the administrator to whichever user (referred to herein as the collaborator) touches an icon in the security palette 142-2 (FIG. 3) or touches the security palette 142-2.

If the icon in the security palette 142-2 that is touched by the collaborator represents a task, such as the update task icon 230, then the controller 136 gives the collaborator the authority for the task to access all data objects, window objects or system objects for which the administrator has authority to access.

If the icon in the security palette 142-2 that is touched by the collaborator represents a data object (e.g., the data object icon 210), a system object, or a window object (e.g., the window object icon 208), then the controller 136 scopes the administrator authority to just those objects represented by icons within the security palette 142-2, and the collaborator may use any tasks represented by icons outside of the security palette 142-2, for which the collaborator has authority, to access the data object, the window object, or the system object represented by the icon inside the security palette 142-2. The collaborator may further use any task represented by icons inside the security palette 142-2 to access the data object represented by the icon inside the security palette 142-2.

The administrator does not necessarily have authority to all objects, so in response to the administrator creating the security palette 142-1 (FIG. 2) and moving objects to within the security palette 142-1, the controller 136 only grants authority to the security palette 142-2 to those objects for which the administrator has authority. In response to the collaborator moving the security palette 142-2 over an object or moving an object to be within the security palette 142-2, the controller 136 highlights the objects or displays an indicator to indicate which of the objects in the security palette 142-2 the collaborator has authority. In the example of FIG. 3, the collaborator is authorized to the objects represented by the icons 208, 210, and 230 (and so the icons 208, 210, and 230 are highlighted or an authority indicator is displayed) because the administrator previously moved the icons 208, 210, and 230 within the security palette 142-1 and the administrator has authority to the objects represented by the icons 208, 210, and 230. But, if the collaborator moves the icon 220 into the security palette 142-2 and the administrator does not have authority to the object represented by the icon 220, then the icon 220 is not highlighted, and the collaborator does not have authority to the object represented by the icon 220 and does not have the administrator's authority to perform any temporarily granted tasks represented by icons in the security palette 142-2.

Thus, the display of the security palette 142-2 gives a visual indication of which objects the collaborator has authority to access and which objects the collaborator does not have authority to access. Thus, the collaborator may use the security palette 142-2 like a lens over various icons to perform tasks (using the temporarily granted authority), or the collaborator may use the security palette 142-2 like a portal to temporarily manage the objects added by the administrator using the administrator's authority. Further, any active window added to the security palette 142-2 by the administrator may be used by both the administrator and the collaborator in a shared multi-touch screen 121-2 on a single display where the collaborator is using the administrator's authority.

As an example of the use of the security palette 142-2, if the administrator needs help installing updates across a number of systems, the administrator drags the update task icon 230 into the security palette 142-1 and then flips the security palette 142-1 to the collaborator. Once the collaborator receives the security palette 142-1 (as the security palette 142-2), the collaborator now has temporary ability to install updates. The collaborator may touch the security palette 142-2 and then touch the system object icon 220-2, drag the system object icon 220 into the security palette 142-2, or stretch or move the security palette 142-2 to be over the system object icon 220. In response, the controller 136 verifies that the collaborator now has temporary ability to install updates on the system object icon 220-2, and if so displays an icon representing an install update task. The collaborator may select the install update task and cause installation to occur to the system represented by the system object icon 220 while optionally consulting with the administrator.

Figure 4:
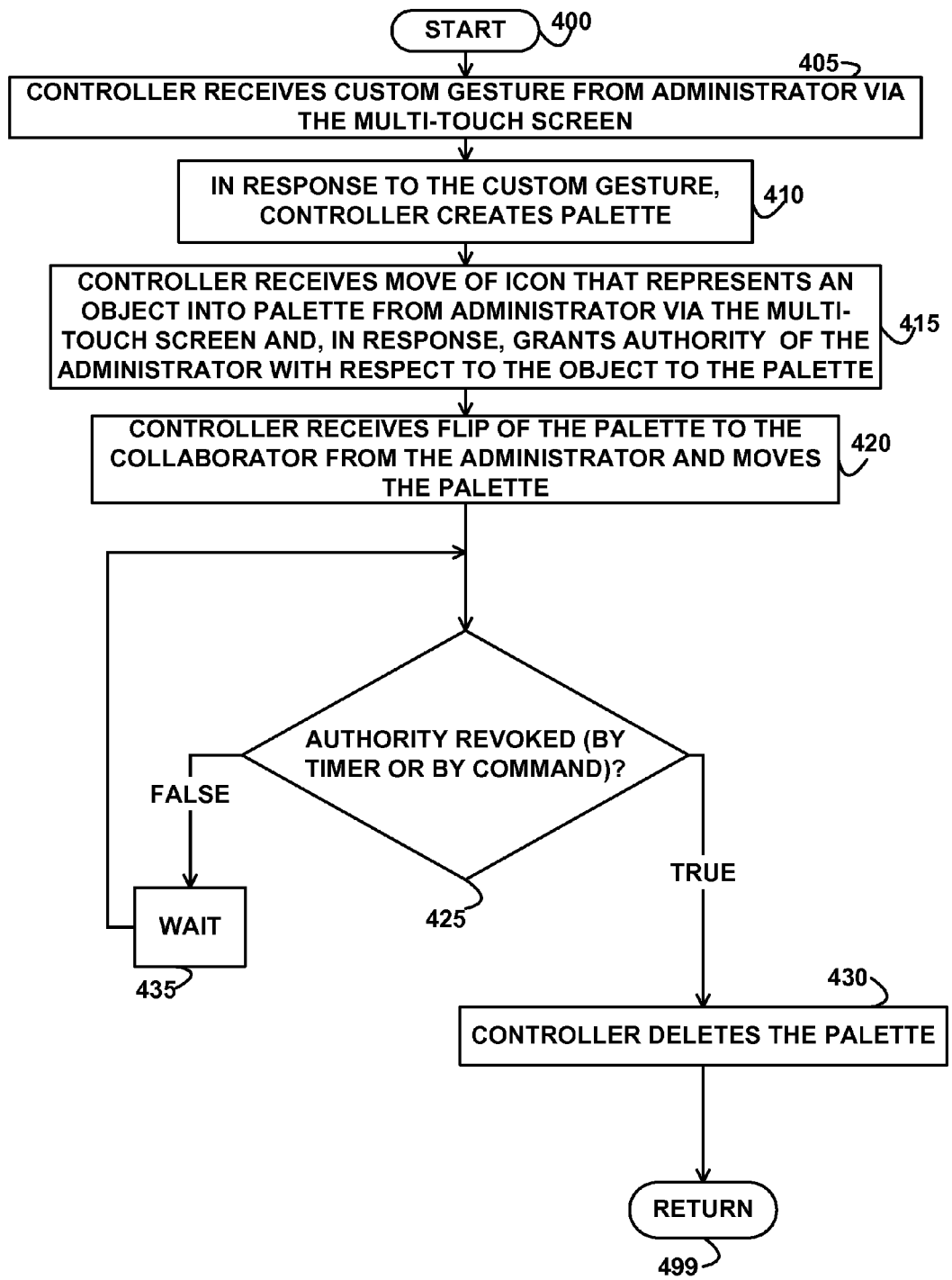
FIG. 4 depicts a flowchart of example processing for an administrator interacting with a security palette, according to an embodiment of the invention.

FIG. 4 depicts a flowchart of example processing for an administrator interacting with a security palette, according to an embodiment of the invention. In an embodiment, the logic of FIG. 4 is reentrant and may be invoked or be executed multiple times, in response to multiple custom gestures, in multiple threads concurrently or simultaneously on the same or different processors via multi-tasking, multi-threading, or multi-programming techniques. Control begins at block 400. Control then continues to block 405 where the controller 136 receives a custom gesture 202 from the administrator via the multi-touch screen 121-1. Control then continues to block 410 where, in response to the custom gesture, the controller 136 creates and displays the custom gesture 202 on the multi-touch screen 121.

Control then continues to block 415 where the controller 136 receives, from the multi-touch screen 121, a move of icon that represents an object into the security palette 142 from an administrator and, in response, grants the authority of the administrator with respect to the object to the security palette 142.

Control then continues to block 420 where the controller 136 receives, from the multi-touch screen 121, a flip operation of the security palette 142 to the collaborator from the administrator. In response to the flip operation, the controller 136 moves the security palette 142 to be located and displayed in proximity to the collaborator, where the location is specified by the flip operation.

Control then continues to block 425 where the controller 136 determines whether the authority granted to the security palette 142 has been revoked by expiration of the authority (a temporary time period during which the authority is granted has ended or timed out) or by selection of the revoke button 204 by the administrator, which causes a revoke command to be sent from the multi-touch screen 121 to the controller 136.

If the determination at block 425 is true, then the authority granted to the security palette 142 has been revoked, so control continues to block 430 where the controller 136 deletes the security palette 142 from the multi-touch screen 121, which revokes the authority of the security palette 142 and which revokes the authority of the collaborator that the collaborator gained by touching the security palette 142. Thus, in an embodiment, the security palette 142 enables the administrator to grant temporary object access to a collaborator. Control then continues to block 499 where the logic of FIG. 4 returns.

If the determination at block 425 is false, then the authority granted to the security palette 142 has not been revoked, so control continues to block 435 where the controller 136 waits for a period of time. Control then returns to block 425, as previously described above.

Figure 5:
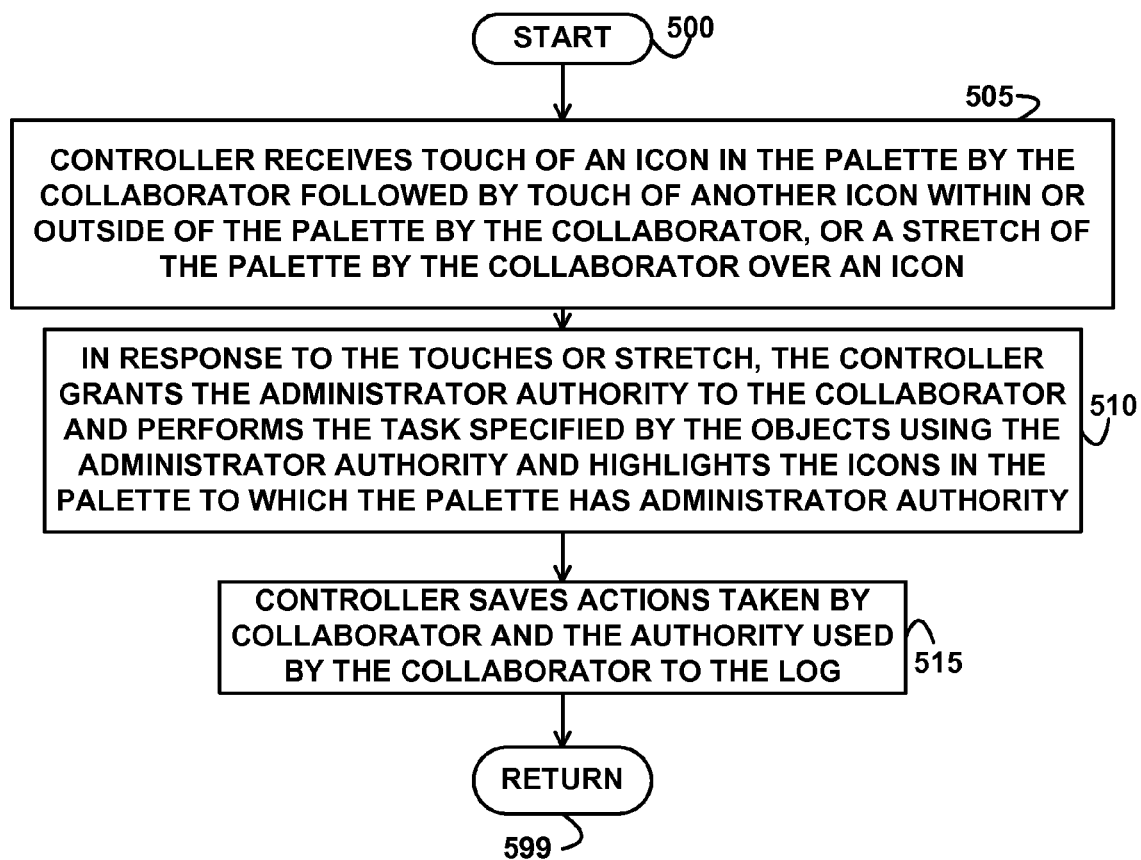
FIG. 5 depicts a flowchart of example processing for a collaborator interacting with a security palette, according to an embodiment of the invention.

FIG. 5 depicts a flowchart of example processing for a collaborator interacting with a security palette, according to an embodiment of the invention. In an embodiment, the logic of FIG. 5 is reentrant and may be invoked or be executed multiple times, in response to multiple touches of icons, in multiple threads concurrently or simultaneously on the same or different processors via multi-tasking, multi-threading, or multi-programming techniques. Control begins at block 500. Control then continues to block 505 where the controller 136 receives a touch of an icon in the security palette 142 by the collaborator followed by a touch of another icon within or outside of the security palette 142 by the collaborator, a touch of the security palette 142 by the collaborator, or a stretch of the security palette 142 by the collaborator over an icon.

Control then continues to block 510 where, in response to the touches or stretch, the controller 136 grants temporary administrator authority to the collaborator for the objects represented by icons in the security palette 142 and performs the task specified by the objects using the administrator authority and highlights or identifies the icons that represent objects for which the security palette 142 has administrator authority.

In an embodiment, in response to the collaborator touching an icon within the security palette 142, the controller 136 grants the same authority (to the object represented by the icon) to the collaborator that the administrator possesses. In an embodiment, the controller 136 does not verify the identity of the collaborator.

In an embodiment, the object in the security palette 142 represented by an icon that is touched by the collaborator comprises a task comprising instructions that execute on the processor 101, and in response to the collaborator touching the icon in the security palette 142, the controller 136 causes the instructions of the task to execute on the processor using the same authority as that of the administrator or causes the task to appear in a system object context menu, from which the collaborator may select the task for execution on the processor.

In an embodiment, the controller 136 causes the instructions of the task to execute using the same authority of the administrator to access an object represented by an icon that the collaborator has caused to be displayed within the security palette 142, such as by the collaborator moving the security palette 142 over the icon or stretching the palette to be over the icon.

In an embodiment, in response to a move by the administrator of an icon to within the security palette 142, and in response to the collaborator touching icons in the security palette 142 that represent a task and a data object, the controller 136 causes the instructions of the task to execute and access the data object using the same authority as that of the administrator.

In an embodiment, the controller 136 prevents the instructions of the task from accessing other objects that are represented by icons that are displayed outside of the security palette 142.

In an embodiment, the controller 136 allows the instructions of the task, using the same authority of the administrator, to access objects that are represented by icons that are displayed outside of the security palette 142, in response to the collaborator touching a task icon in the security palette 142 and touching the system or data icons displayed outside of the security palette 142.

In an embodiment, the authority granted to the collaborator in response to the collaborator touching an icon within the security palette 142 is different from the authority that the collaborator has to the object represented by the icon while the icon is displayed outside the security palette 142.

Control then continues to block 515 where the controller 136 saves the actions taken by the collaborator and the authority used by the collaborator to the log 138, which preserves information regarding which user performed which action with which authority. In an embodiment, the controller 136 saves the security palette details to the log 138, such as the identifier of the administrator who created the security palette 142 and the identity of the user who flipped to security palette 142 to the collaborator. Control then continues to block 599 where the logic of FIG. 5 returns.

While embodiments of the invention have described herein in the context of computer systems management, other collaborative examples may include education, science laboratories, and multi-player gaming, wherein the security palette 142 temporarily gives a collaborator a special game piece, tool, or ability.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:

in response to a gesture by an administrator, creating a security palette displayed on a multi-touch screen providing a user interface that receives touch gestures from the administrator and a collaborator, wherein the administrator has authority over a subset of the objects on the screen, and wherein the collaborator has authority over a different subset of the objects on the screen;

in response to a move by the administrator of a first icon outside of the security palette to within the security palette, wherein the first icon represents a first object, wherein the administrator has authority over the first object, and wherein the collaborator has no authority over the first object, granting the authority that the administrator has over the first object to the security palette;

in response to the collaborator touching the security palette, granting the authority that the administrator has over the first object to the collaborator, wherein the collaborator has no authority over the first object when the first icon is outside the security palette;

in response to a move by the collaborator of a second icon outside of the security palette to within the security palette, wherein the second icon represents a second object; wherein the administrator has no authority over the second object, and wherein the collaborator has authority over the second object before the second icon is moved within the security palette, removing the authority that the collaborator has over the second object, and;

displaying visual indicators inside the security palette that indicate that the collaborator has authority over the first object and no authority over the second object.

2. The method of claim 1, wherein the first object comprises a task comprising instructions that execute on a processor, and wherein the granting the authority that the administrator has over the first object to the collaborator further comprises:

in response to the collaborator touching the security palette, performing the instructions of the task using the authority of the administrator.

3. The method of claim 2, further comprising:

in response to a move by the administrator of a third icon to within the security palette, and in response to the collaborator touching the security palette and touching the third icon in the security palette, wherein the third icon represents a third object, performing the instructions of the task to access the third object using the authority of the administrator.

4. The method of claim 3, further comprising:

preventing the instructions of the task from accessing other objects that are represented by other icons that are displayed outside of the security palette.

5. The method of claim 3, further comprising:

allowing the instructions of the task, using the authority of the administrator, to access other objects that are represented by other icons that are displayed outside of the security palette, in response to the collaborator touching the security palette and touching the other icons displayed outside of the security palette.

6. The method of claim 1, wherein the first object comprises a window.

7. The method of claim 1, wherein the first object comprises a system.

8. A non-transitory computer-readable storage medium encoded with instructions, wherein the instructions when executed comprise:

in response to a gesture by an administrator, creating a security palette displayed on a multi-touch screen providing a user interface that receives touch gestures from the administrator and a collaborator, wherein the administrator has authority over a subset of the objects on the screen, and wherein the collaborator has authority over a different subset of the objects on the screen;

in response to a move by the administrator of a first icon outside of the security palette to within the security palette, wherein the first icon represents a first object, wherein the administrator has authority over the first object, and wherein the collaborator has no authority over the first object, granting the authority that the administrator has over the security palette;

in response to the collaborator touching the security palette, granting the authority that the administrator has over the first object to the collaborator, wherein the collaborator has no authority over the first object while the first icon is displayed outside the security palette;

in response to a move by the collaborator of a second icon outside of the security palette to within the security palette, wherein the second icon represents a second object; wherein the administrator has no authority over the second object, and wherein the collaborator has authority over the second object before the second icon is moved within the security palette, removing the authority that the collaborator has over the second object, and;

displaying visual indicators inside security palette that indicate that the collaborator has authority over the first object and no authority over the second object.

9. The computer-readable storage medium of claim 8, wherein the first object comprises a task comprising instructions that execute on a processor, and wherein the granting the authority that the administrator has over the first object to the collaborator further comprises:

in response to the collaborator touching the security palette, performing the instructions of the task using the authority of the administrator.

10. The computer-readable storage medium of claim 9, further comprising:

in response to a move by the administrator of a third icon to within the security palette, and in response to the collaborator touching the security palette and touching the third icon in the security palette, wherein the third icon represents a third object, performing the instructions of the task to access the third object using the authority of the administrator.

11. The computer-readable storage medium of claim 10, further comprising:

preventing the instructions of the task from accessing other objects that are represented by other icons that are displayed outside of the security palette.

12. The computer-readable storage medium of claim 10, further comprising:

allowing the instructions of the task, using the authority of the administrator, to access other objects that are represented by other icons that are displayed outside of the security palette, in response to the collaborator touching the security palette and touching the other icons displayed outside of the security palette.

13. The computer-readable storage medium of claim 8, wherein the first object comprises data.

14. The computer-readable storage medium of claim 8, wherein the first object comprises a system.

15. A computer system comprising:
   a multi-touch screen;
   a processor communicatively coupled to the multi-touch screen; and
   memory communicatively coupled to the processor, wherein the memory is encoded with instructions, wherein the instructions when executed by the processor comprise:
   in response to a gesture by an administrator, creating a security palette displayed on the mufti-touch screen providing a user interface that receives touch gestures from the administrator and a collaborator, wherein the administrator has authority over a subset of the objects on the screen, and wherein the collaborator has authority over a different subset of the objects on the screen;
   in response to a move by the administrator of a first icon outside of the security palette to within the security palette, wherein the first icon represents a first object, wherein the administrator has authority over the first object, and wherein the collaborator has no authority over the first object, granting the authority that the administrator has over the first object to the security palette;
   in response to the collaborator touching the security palette, granting the authority that the administrator has over the first object to the collaborator, wherein the collaborator has no authority over the first object while the first icon is displayed outside the security palette, wherein the first object comprises a task comprising instructions that execute on the processor, and in response to the collaborator touching the security palette, performing the instructions of the task using the authority of the administrator;
   in response to a more by the collaborator of a second icon outside of the security palette to within the security palette, wherein the second icon represents a second object; wherein the administrator has no authority over the second object, and wherein the collaborator has authority over the second object before the second icon is moved within the security palette, removing the authority that the collaborator has over the second object, and;
   displaying a visual indicators inside the security palette that indicate that the collaborator has authority over the first object and no authority over the second object.

16. The computer system of claim 15, further comprising:
   in response to a move by the administrator of a third icon to within the security palette, and in response to the collaborator touching the security palette and touching the third icon in the security palette, wherein the third icon represents a third object, performing the instructions of the task to access the third object using the authority of the administrator.

17. The computer system of claim 16, further comprising:
   preventing the instructions of the task from accessing other objects that are represented by other icons that are displayed outside of the security palette.

18. The computer system of claim 16, further comprising:
   allowing the instructions of the task, using the authority of the administrator, to access other objects that are represented by other icons that are displayed outside of the security palette, in response to the collaborator touching the security palette and touching the other icons displayed outside of the security palette.

19. The computer system of claim 15, wherein the first object comprises data.

* * * * *